United States Patent
Koss et al.

(10) Patent No.: US 8,971,555 B2
(45) Date of Patent: Mar. 3, 2015

(54) MULTI-MODE, WEARABLE, WIRELESS MICROPHONE

(71) Applicant: Koss Corporation, Milwaukee, WI (US)

(72) Inventors: Michael J. Koss, Milwaukee, WI (US); Nick S. Blair, Whitefish Bay, WI (US); Michael J. Pelland, Princeton, WI (US)

(73) Assignee: Koss Corporation, Milwaukee, WI (US)

( * ) Notice: Subject to any disclaimer, the term of this patent is extended or adjusted under 35 U.S.C. 154(b) by 0 days.

(21) Appl. No.: 13/917,097

(22) Filed: Jun. 13, 2013

(65) Prior Publication Data

US 2014/0370855 A1    Dec. 18, 2014

(51) Int. Cl.
*H04R 25/00* (2006.01)
*H04M 3/533* (2006.01)

(52) U.S. Cl.
CPC ................................. *H04M 3/53366* (2013.01)
USPC .......................................... 381/312; 381/314

(58) Field of Classification Search
CPC ........................... H04R 1/1041; H04R 2225/61
USPC .................................................. 381/312, 315
See application file for complete search history.

(56) References Cited

U.S. PATENT DOCUMENTS

| | | | |
|---|---|---|---|
| 5,389,917 A | 2/1995 | LaManna et al. | |
| 5,881,104 A | 3/1999 | Akahane | |
| 6,333,984 B1 * | 12/2001 | Yang | 381/364 |
| 7,349,551 B2 | 3/2008 | Skillicorn et al. | |
| 8,190,203 B2 | 5/2012 | Pelland et al. | |
| 2003/0031327 A1 | 2/2003 | Bakis et al. | |
| 2006/0097983 A1 * | 5/2006 | Haggman et al. | 345/156 |
| 2006/0166715 A1 | 7/2006 | Van Engelen et al. | |
| 2006/0270465 A1 | 11/2006 | Lee et al. | |
| 2007/0225049 A1 * | 9/2007 | Andrada | 455/569.1 |
| 2010/0119099 A1 | 5/2010 | Haupt et al. | |
| 2011/0306375 A1 | 12/2011 | Chandra et al. | |
| 2012/0075177 A1 | 3/2012 | Jacobsen et al. | |
| 2013/0040609 A1 * | 2/2013 | Balannik et al. | 455/412.2 |

FOREIGN PATENT DOCUMENTS

| | | |
|---|---|---|
| WO | WO 2011/031910 A1 | 3/2011 |
| WO | WO 2012/116123 A2 | 8/2012 |

OTHER PUBLICATIONS

International Search Report and Written Opinion for PCT/US2014/039743 dated Aug. 29, 2014 (9 pages).

* cited by examiner

*Primary Examiner* — Ahmad F Matar
*Assistant Examiner* — Norman Yu
(74) *Attorney, Agent, or Firm* — K&L Gates LLP (57) ABSTRACT

A microphone assembly that captures audio/voice recordings and wirelessly transmits them to different desired network destinations based on an operating mode specified by the user. The microphone assembly may comprise a non-graphical-display user interface tap detection circuit, through which a user of the microphone assembly controls operation of the microphone assembly. For example, the user may tap the user interface tap detection circuit, and different tap sequences may correspond to different operating modes for the microphone assembly. The microphone assembly may also comprise a clip for clipping the microphone assembly to a garment of the user.

15 Claims, 7 Drawing Sheets

MULTI-MODE, WEARABLE, WIRELESS MICROPHONE

BACKGROUND

Conventional wireless microphones typically have a radio transmitter that transmits the audio signal from the microphone by analog-modulated (e.g., FM or AM) radio waves to a nearby receiver unit, which recovers the audio. Digital wireless microphones are also becoming more prevalent. For example, Bluetooth headsets, which typically have both a microphone and headphone, are available. In such Bluetooth headsets, audio captured by the microphone is sent wirelessly, via a Bluetooth connection, to another piece of electronic equipment, usually a cellular phone. Such Bluetooth headsets, however, typically do not record and store the audio picked up by the microphone, but rather transmit it in real time. Also, advanced smartphones commonly have microphones and software applications ("apps") for capturing and sharing voice recordings. Some such smartphone apps permit audio to be recorded, stored, and transmitted, via a Wi-Fi network, a cell phone network, or a Bluetooth connection, to other devices, such as by email or text messaging.

SUMMARY

In one general aspect, the present invention is directed to a microphone assembly that captures audio/voice recordings and wirelessly transmits them (e.g., via a Wi-Fi network) to different desired network destinations based on an operating mode specified by the user. In various implementations, the microphone assembly comprises a processor and a microphone for capturing the audio/voice recordings. The microphone assembly also comprises a wireless communication circuit in communication with the processor for transmitting wirelessly from the microphone assembly the audio/voice recording captured by the microphone. The microphone assembly also comprises a non-graphical-display user interface tap detection circuit, through which a user of the microphone assembly controls operation of the microphone assembly. For example, the user may tap the user interface tap detection circuit, and different tap sequences may correspond to different operating modes for the microphone assembly. For example, one tap sequence may correspond to a first operating mode where the microphone assembly wirelessly transmits the captured audio recording to a first destination (e.g., an intercom system), and a second tap sequence corresponds to a second operating mode where the microphone assembly wirelessly transmits the captured audio recording to a second destination (e.g., a notes database, a speaker system, an electronic equipment controller, etc.), and so on. Also, the microphone assembly comprises a memory unit in communication with the processor. The memory unit stores instructions that programs the processor to determine the network destination to which to wirelessly transmit, via the wireless communication circuit, the voice recording captured by the microphone based on the operating mode for the microphone assembly that is determined based on the tap sequence detected through the user interface tap detection circuit. The microphone assembly may also comprise a clip for clipping the microphone assembly to a garment of the user.

These and other benefits of the present invention will be apparent from the description that follows.

FIGURES

Various embodiments of the present invention are described herein by way of example in conjunction with the following figures, wherein.

DESCRIPTION

Figure 3:
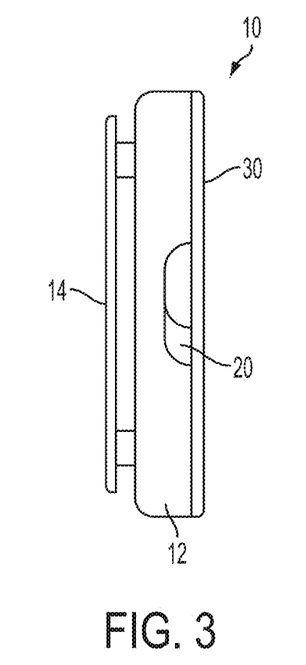
FIG. 3 is a left side view of the microphone of FIGS. 1-2 according to various embodiments of the present invention.
Figure 4:
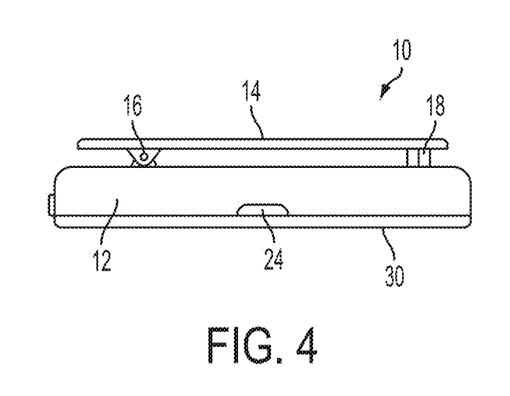
FIG. 4 is a bottom side view of the microphone of FIGS. 1-3 according to various embodiments of the present invention.
Figure 5:
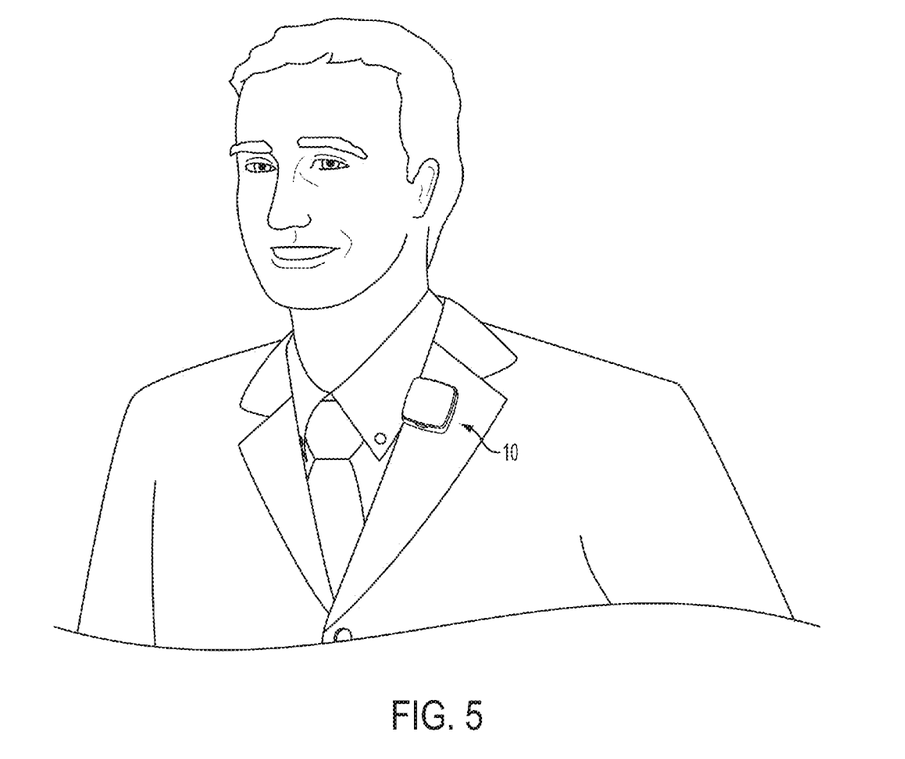
FIG. 5 is a diagram of a user wearing the microphone of FIGS. 1-4 according to various embodiments of the present invention.

The present invention is directed generally to a multimode, wearable, wireless microphone that wirelessly transmits captured audio or voice recordings to different network destinations based on a user-specified operating mode. FIGS. 1-4 show such a microphone 10 according various embodiments. The microphone 10 comprises a housing 12 and a clip 14. The clip 14 may connect to the housing 12 with a spring loaded hinge 16 at one edge of the clip 14 that biases the clip 14 in the closed position (as shown in FIGS. 3-4). At the opposite edge, the clip 14 may include a ridge 18 extending from a back surface of the clip 14 toward the housing 12 and which contacts the back the housing 12 when the clip 14 is in the closed position (as shown in FIGS. 3-4). The height of the ridge 18 (i.e., its spacing from back of the housing 12) may be approximately equal to the height of the spring loaded hinge 16 so that the clip 14 is roughly parallel to the back of the housing 12 when the clip 14 is in the closed position. That way the microphone 10 could be clipped to a garment or article of clothing of a user of the microphone 10, preferably near the user's mouth, as shown in FIG. 5, to pick up audible voice utterances by the user.

Figure 1:
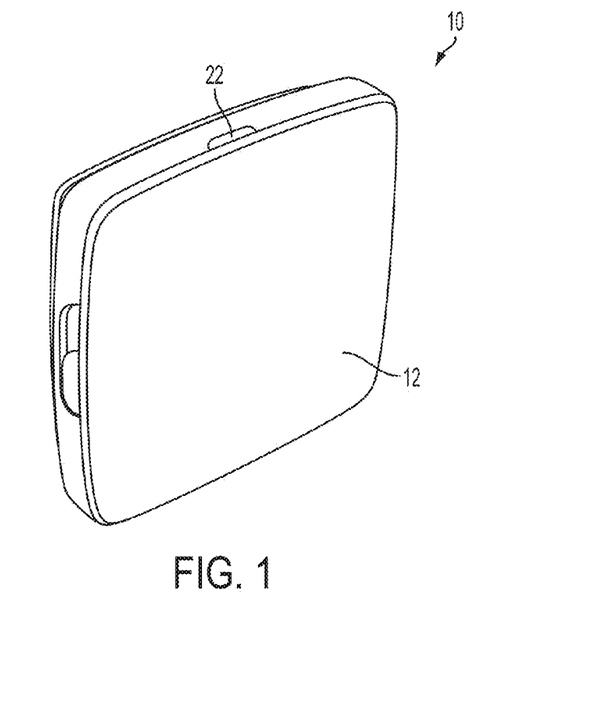
FIG. 1 is a front perspective view of a microphone according to various embodiments of the present invention.
Figure 2:
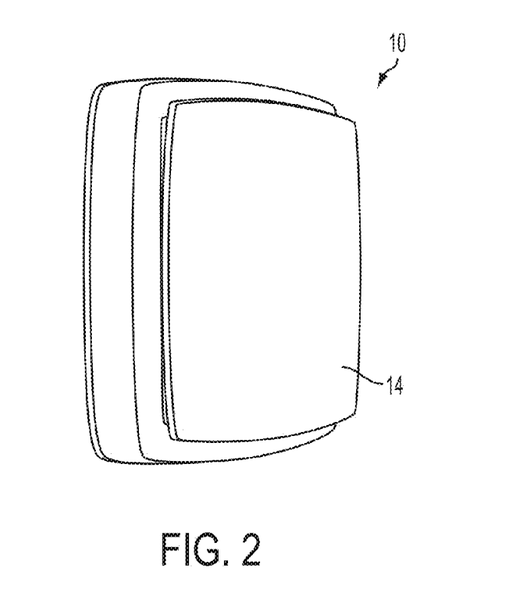
FIG. 2 is a back perspective view of the microphone of FIG. 1 according to various embodiments of the present invention.

Other external features of the microphone 10 may include: a multi-position slide switch 20, preferably on a side of the housing 12, as shown in FIG. 3; a light indicator (e.g., LED) 22, also preferably on a side of the housing 12, as shown in FIG. 1; and a connection port 24, also preferably on a side of the housing 12. For example, the connection port may be on an opposite side (bottom) of the housing 12 from the light indicator 22 (top side). The connection port may be, for example, a micro-USB port to which a user may connect a micro-USB cable. The micro-USB cable may connect to a charger for charging the battery of the microphone 12 or the micro-USB may connect to a computer (e.g., PC, laptop or tablet computer), which may also charge the battery of the microphone 12 and/or provide a way to download files from the microphone 12 to the computer. Through the connected computer, the user of the microphone may also specify various remote network destinations for the audio recordings captured by the microphone 10 that are to be sent wirelessly by the microphone 10, as explained further below.

The multi-position switch 20 may allow the user to switch the microphone 10 on, off or into standby mode. For example, the switch 20 may slide lengthwise, and one position (e.g., far right or up depending on orientation) turns the microphone on, another positions (e.g., center) turns it off, and a third position (far left or down) puts the microphone 10 in standby mode. In the standby mode, the microphone 10 stays on but for only a limited time period (e.g., a few minutes) before switching off. The user may wake the microphone 10 by tapping the front face 30 of the housing 12 to wake it. As described further below, the front face 30 may include a non-graphical-display user interface tap detection circuit to detect taps by the user of the front face 30, through which taps the user can control the operation of the microphone 10 (such as wake it when in standby mode).

The light indicator 22 may include a multi-color LED, where the different emitted colors of the LED indicate the different operations of the microphone. For example, one color may be used to indicate that the microphone is charging; another color may indicate when it is on; another color may indicate when it is in standby mode; and another color may indicate when the microphone is powering down. Of course, in other embodiments, a fewer or more colors may be used as operation indicators depending on the number of different modes or operations of the microphone 10 that are to be indicated by the LED. Also, in other embodiments, multiple LEDs may be used.

As shown in FIGS. 1-4, the microphone preferably does not have a graphical display screen (or touch screen graphical display user interface). Eliminating the graphical display allows the microphone 10 to be smaller in size and to consume less power, thereby extending battery life. For example, the microphone 10 may have a height of 30 to 40 mm, a length of 30 to 40 mm, and a depth of 8 to 12 mm.

Figure 6:
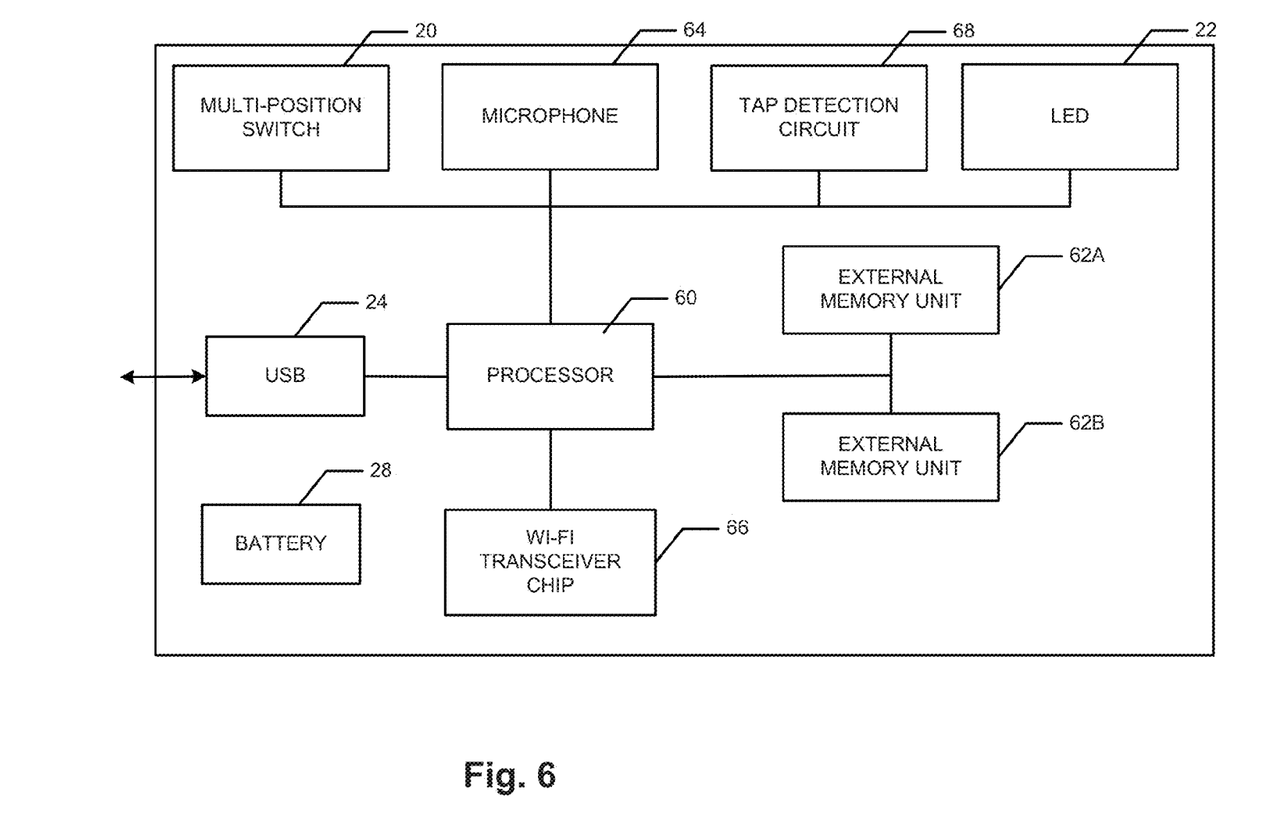
FIG. 6 is a block diagram of the microphone according to various embodiments of the present invention.

FIG. 6 is a block diagram of the electrical components of the microphone according to various embodiments, which may be housed within the housing 12. As shown in FIG. 6, the microphone 10 may comprise a processor 60 and memory. The memory may be embedded in the processor 60 and/or one or more external memory chips 62A-B. For example, in various embodiments, the processor 60 may comprise embedded RAM and ROM, and the external memory chips may comprise external RAM 62A (e.g., 128 MB) and/or flash memory 62B (e.g., 16 Mb). The processor 60 preferably has embedded audio processing and memory management capability, and a codec. In various embodiments, the processor 60 may be, for example, an AMS AS3536 processor or any other suitable audio processor. In other (less preferred) embodiments, these various capabilities may be distributed across multiple chips and/or the processor may be implemented with a FPGA or ASIC. The memory (either external or embedded) may store instructions (software and/or firmware) for execution by the processor 60. Of course, the housing 12 also includes a microphone 64, which may be a MEMS microphone chip with a built-in analog-to-digital converter (ADC) (and/or the processor 60 may have a built-in ADC) (note that the claims refer to the microphone 10 as a "microphone assembly" to differentiate it from the microphone 64, which is an acoustic-to-electric transducer). The processor 60 may control, and receive the audio captured by, the microphone 64 through an embedded I2S interface, for example. Also as shown in FIG. 6, the microphone assembly 10 may comprise a wireless communication circuit 66 connected to the processor 60 that handles radio/wireless communications by the microphone 10. In various embodiments, the wireless communication circuit 66 may be a separate chip from the processor 60 (as shown in FIG. 6) or it could be integrated with the processor 60. Any suitable wireless communication protocol may be used, and preferably a protocol that is capable of communicating with a packet-switched network (e.g., the Internet) through an access point is utilized, such as the Wi-Fi protocols (such as IEEE 802.11 a, b, g, and/or n), or WiMAX (IEEE 802.16), or any other suitable protocol. In an embodiment where the wireless communication circuit 66 is a separate chip from the processor 60, the wireless communication circuit 66 may comprise, for example, a NanoRadio NRG731 chip As mentioned previously, the microphone may also comprise the multi-position switch 20, the LED 22, a USB port 24 and a battery 28 for powering the components of the microphone 10. The USB port 24 (or other external interface) allows the microphone to connect to an external device, such as a computer or charger. The battery 28 may comprise, for example, a Li ion or other suitable chargeable battery.

In addition, the microphone 10 may comprise a tap detection circuit 68 that may comprise one or more switches that detect taps by a user on the front face 30 (see FIGS. 1-4) of the microphone 10. The tap detection circuit 68 may comprise any suitable switch(es) for detecting taps on the front face 30, such as, a tactile or non-tactile membrane switch(es) or a type of click-button switch(es). Different tap sequences from a user, detected by the tap detection circuit 68, can configure the microphone to transmit wirelessly, from the wireless communication circuit 66, audio captured by the microphone (e.g., voice recordings) to different remote locations or systems. As the microphone 10 preferably does not include a graphical user interface or touch display screen, the housing 12, including the front face 30, may be made of plastic, and the different input tap sequences from the user can control the operation of the microphone.

Figure 7:
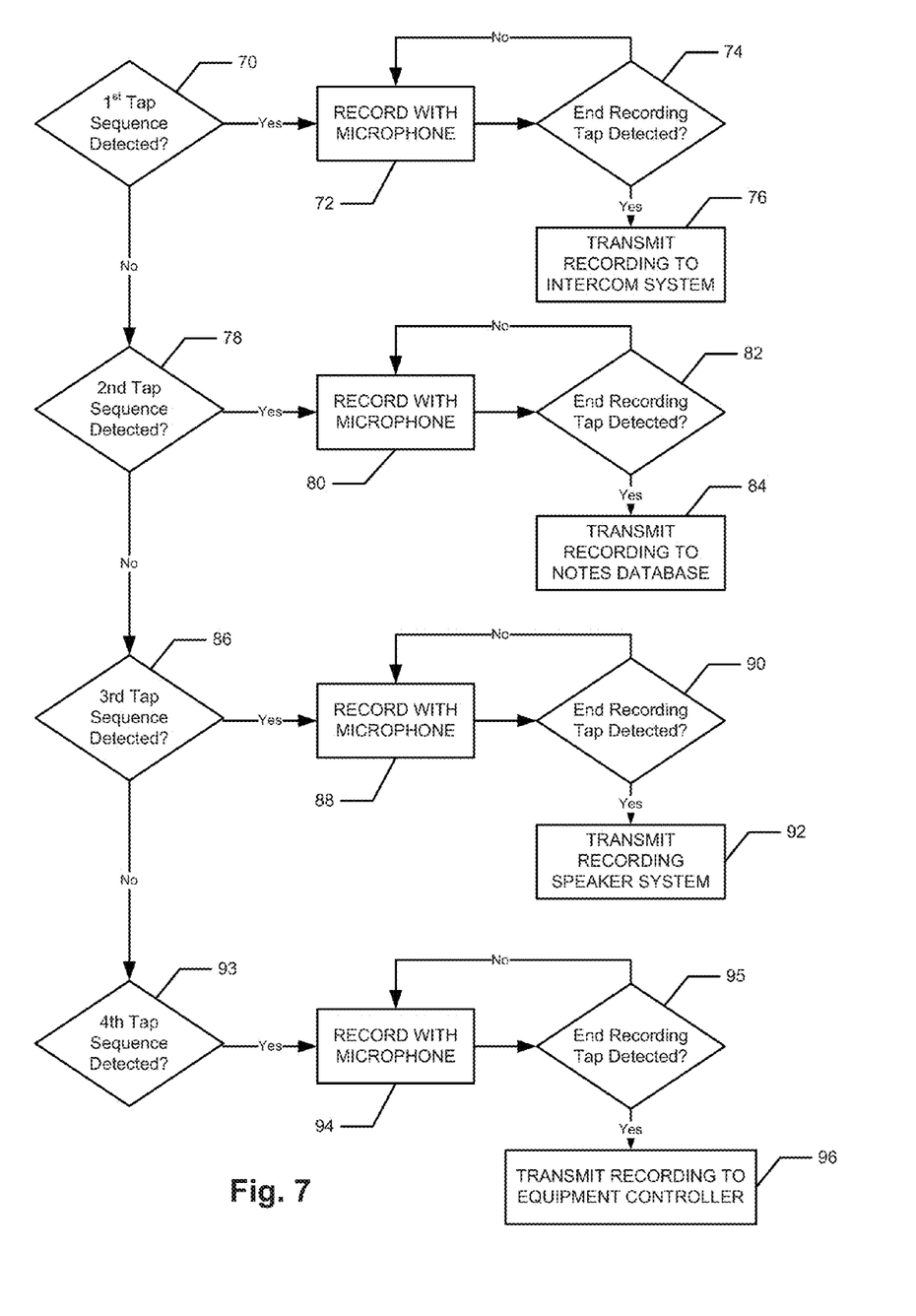
FIG. 7 is a flow chart of the process flow of the processor of the microphone according to various embodiments of the present invention.
Figure 8:
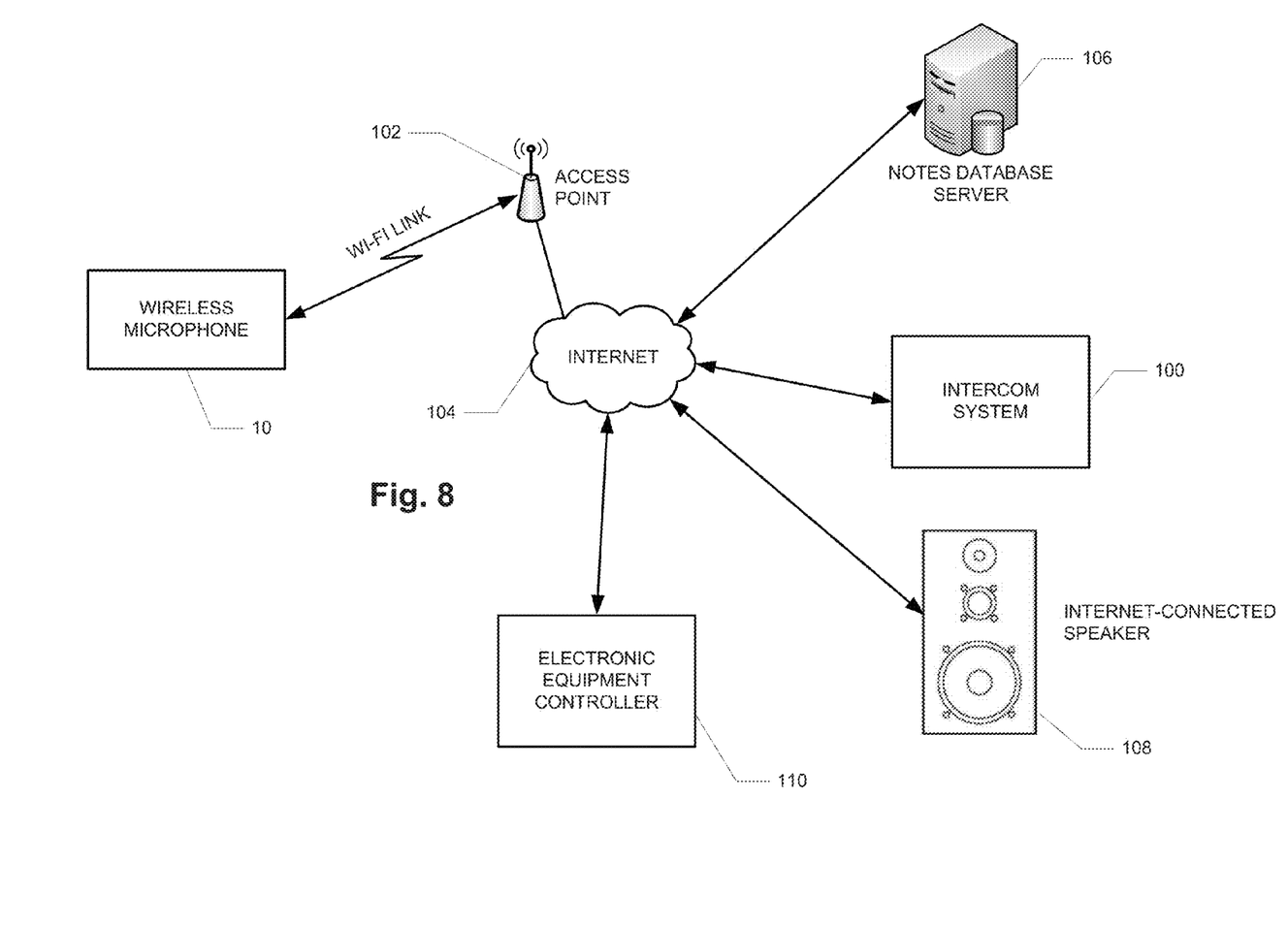
FIG. 8 is a diagram illustrating various destination of audio recorded by the microphone according to various embodiments of the present invention.

FIGS. 7 and 8 illustrate operation of the microphone according to various embodiments. FIG. 7 is a flow chart that illustrates the function of the microphone 10, as executed by the processor 60 based on instructions stored in memory (e.g., external memory 62A-B or embedded memory). As shown in FIGS. 7 and 8, the microphone 10 records audio from a start time until an end time, and that recorded audio may then be sent wirelessly to various remote destinations depending on the user-specified mode for the microphone 10. The particular remote destinations for the recorded audio may be specified by the user as described further below. As shown in FIGS. 7 and 8, the user may specify the mode of the microphone 10 through different tap sequences on the front face 30 of the housing 12, which tap sequences are detected by the tap detection circuit 68 and interpreted by the processor 60 (based on software and/or firmware stored in memory). The example of FIGS. 7 and 8 uses four different tap sequences (corresponding to four different remote destinations for the recorded audio), although in other embodiments, fewer or more tap sequences and corresponding destinations may be used.

In the example of FIG. 7, at step 70, if a first tap sequence is detected, such as one short tap, the microphone 64 initiates recording audio (step 72), until a second tap (the tap to signify to end the recording) is detected at step 74. The first tap sequence (a single short tap in this example) may correspond to an operating mode in which the captured audio/voice recording is transmitted wirelessly to a remote intercom system 100 at step 76. Referring to FIG. 8, the wireless microphone 10 transmits the recorded audio to the intercom system 100 via a Wi-Fi data link to an access point 102 (e.g., "hotspot") that is connected to the internet 104. The microphone 10 may be set up to communicate with the access point 102 as described further below. In such an embodiment, the intercom system 100 may be connected to the internet 104 through a wired or wireless connection, and has the capability to play the recorded audio through one or more loud speakers of the intercom system.

Returning to FIG. 7, if the first tap sequence is not detected, but instead the second tap sequence is detected, such as two successive, short, closely-spaced taps (step 78), the microphone 64 initiates recording the audio/voice (step 80), until a second tap (the tap to signify to end the recording) is detected at step 82. The second tap sequence (two successive short taps in this example) may correspond to a mode in which the captured audio/voice recording is transmitted wirelessly to a remote notes database/server system 106 (see FIG. 8) at step 84. The notes database/server system 106 may store the audio/voice recording as a file for later access by the user, and/or may automatically transcribe the audio/voice recording to text, again for later access by the user. In the later case, the notes database/server system 106 has the capability to recognize the speech in the audio/voice recording and convert it to text. In this way, the user of the microphone 10 can conveniently convert captured audio comments to notes for later retrieval, review, and use.

If neither the first nor second tap sequences are detected, but instead the third tap sequence is detected, such as one long tap followed shortly thereafter by a short tap (step 86), the microphone 64 initiates recording the audio/voice (step 88), until a second tap (the tap to signify to end the recording) is detected at step 90. The third tap sequence (long tap followed by short tap in this example) may correspond to a mode in which the captured audio/voice recording is transmitted wirelessly to an internet-connected speaker system 108 (see FIG. 8) at step 92. The internet-connected speaker system 108 may play the transmitted audio and may be any suitable type of speaker, such as a computer speaker, a loud speaker, or an earphone (or set of earphones, e.g., headphones), for example. Examples of earphones capable of connecting to the internet are disclosed in U.S. Pat. No. 8,190,203 and published PCT application WO/2011/031910A1, both of which are incorporated herein by references in their entirety.

Finally, if neither the first through third tap sequences are detected, but instead the fourth tap sequence is detected, such as two long, successive taps (step 893), the microphone 64 initiates recording the audio/voice (step 94), until a second tap (the tap to signify to end the recording) is detected at step 95. The fourth tap sequence (two long successive taps) may correspond to a mode in which the captured audio/voice recording is transmitted to an internet-connected controller of electronic equipment 110 (see FIG. 8) at step 96. The controller 110 may be, for example, a thermostat, a light switch controller, a controller for consumer electronics or gaming equipment, a controller for industrial or manufacturing equipment, or any other controller that is configured to recognize commands in the captured audio recording and convert them to commands for the controlled equipment. For example, where the controller 110 is a thermostat, the user may record something like, "Set temperature to 70 degrees" in the microphone 10, which audio recording is transmitted to the controller/thermostat 110, in which case the controller/thermostat 110 recognizes the commands in the audio and consequently sets the temperature for the thermostat to 70 degrees. As another example where the controller controls a lighting system, the recorded audio may say something like, "Set lights at fifty percent," in which case the controller 110 recognizes the commands in the audio and consequently sets the light(s) to 50% of fully on. Other appropriate commands could be used for other controllers, depending on their application.

Figure 9:
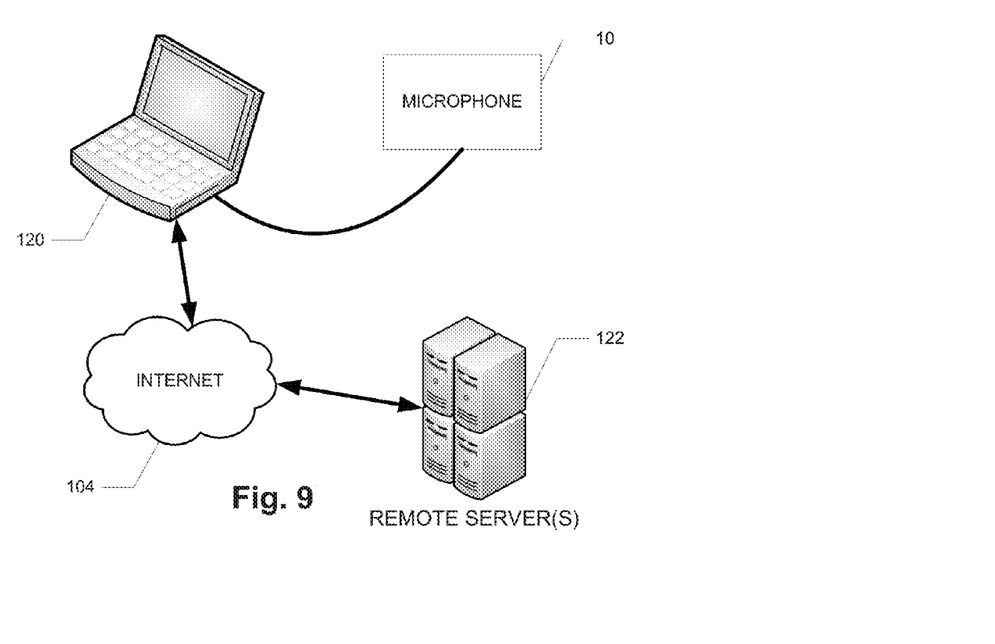
FIGS. 9 and 10 collectively illustrate a process for configuring the microphone according to various embodiments of the present invention.
Figure 10:
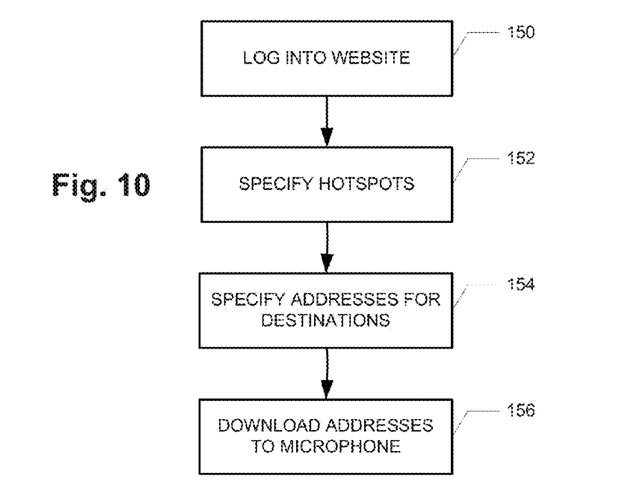

As mentioned before, the user of the microphone 10 may connect the microphone 10 to a computer 120, as shown in FIG. 9, via the USB port 24 for example, in order to configure the microphone, including to set the Wi-Fi hotspots and the destinations for the audio recordings captured by the microphone 10. FIG. 10 is a flow chart of a process for setting up and customizing the microphone 10 according to various embodiments. At step 150, the user (e.g., a user of the microphone 10), using the Internet-enabled computer 120 with a browser, logs into a website associated with the microphone 10, hosted by a remote server(s) 122, and sets up an account (if the user does not already have one). At the website the user can, for example, add Wi-Fi hotspots, such as the Wi-Fi hotspot associated with the access point 102 in FIG. 8. To add a Wi-Fi hotspot at step 152, the user may click (or otherwise activate) a link on the website that indicates a desire to add a Wi-Fi hotspot. In various embodiments, a JAVA applet from the website may be used by the computer 120 to search for nearby Wi-Fi hotspots, which, upon detection, may be displayed for the user on the website. The user may then click on (or otherwise select) the desired Wi-Fi hotspot to add. If applicable, the website may then prompt the user to enter a password and/or encryption type (e.g., WPA or WPA2) for the selected Wi-Fi hotspot. The SSID, password, and encryption type for the Wi-Fi hotspot is stored for the user's account by the remote server(s) 122. This process could be repeated as necessary to add as many Wi-Fi hotspots as desired by the user.

Next, at step 154, the user may specify through the web site the various remote destinations for the recorded audio for the various modes. For example, with reference to FIG. 8, the user may specify the addresses (e.g., IP addresses) of the intercom system 100, the notes database server 106, the internet-connected speaker system 108, and the controller 110 for the electronic equipment. These addresses may be stored by the web server(s) 122 for the website. In one embodiment, at step 156, the web server(s) 122 may download to the microphone 10, via the computer 120, the addresses. That way, when the microphone 10 transmits the recorded audio, it sends the recorded audio to the destination using the address for the desired destination. That is, the data packets from the microphone 10 include the IP address of the desired location. In another embodiment, the addresses of the destinations are not downloaded to the microphone 10. Instead, the remote server(s) 122 stores the addresses, in which case the microphone 10 sends the data packets for the recorded audio to the remote server(s) 122, along with data about the selected user-mode of the microphone 10. The remote server(s) 122 then looks up the desired destination based on the microphone's mode, and forwards the recorded audio to the desired destination via the Internet. This allows the user to easily add, modify and/or update the hotspots and network destinations for the microphone 10.

Also, in various embodiments, once the microphone 10 is enabled for wireless communications (e.g., a hotspot is set up), the network addresses for the various destinations may be downloaded to the microphone 10 wirelessly from the remote server(s) 122, rather than through the computer 120. More details about configuring a wireless device such as the microphone 10 may be found in U.S. patent application Ser. No. 13/832,719, entitled "CONFIGURING WIRELESS DEVICES FOR A WIRELESS INFRASTRUCTURE NETWORK," filed Mar. 15, 2013 which is incorporated herein in its entirety.

In one general respect, therefore, the present invention is directed to a microphone assembly that comprises: a processor;

a microphone in communication with the processor; a wireless communication circuit in communication with the processor for transmitting wirelessly from the microphone assembly a voice recording captured by the microphone; a non-graphical-display user interface tap detection circuit in communication with the processor; and a memory unit in communication with the processor. The user controls operation of microphone assembly through one or more taps of the user interface tap detection circuit, where different tap sequences correspond to different operating modes for the microphone assembly. The memory unit stores instructions that programs the processor to determine a network destination to which to wirelessly transmit, via the wireless communication circuit, the voice recording captured by the microphone based on the operating mode for the microphone assembly that is determined based on the tap sequence detected through the user interface tap detection circuit.

In various implementations, the wireless communication circuit is for wirelessly transmitting the voice recording to the network destination through a wireless access point that is in communication with the wireless communication circuit. In addition, the memory unit may store instructions that programs to the processor to: (i) wirelessly transmit, via the wireless communication circuit, the captured voice recording to first network destination when a first tap sequence, corresponding to a first operating mode, is detected through the user interface tap detection circuit; and (ii) wirelessly transmit, via the wireless communication circuit, the captured voice recording to a second network destination, different from the first network destination, when a second tap sequence, corresponding to a second operating mode, is detected through the user interface tap detection circuit, and so on. The memory unit may store addresses for the first and second network destinations, and the wireless communication circuit may wirelessly transmit the captured voice recording to either the first or second network destinations, depending on the operating mode, using the stored addresses for the first and second network addresses.

In another variation, the wireless communication circuit is for wirelessly transmitting the captured voice recording to a remote server, along with data indicative of the operating mode of the microphone assembly as determined by the tap sequence circuit. In that case, the remote server is for transmitting the captured voice recording to either the first or second network destinations, depending on the operating mode data received from the microphone assembly.

In various implementations, the microphone assembly may further comprise a housing and a clip. The housing houses the processor, the microphone, the wireless communication circuit, the non-graphical-display user interface, and the memory unit. The clip is connected to the housing and is for clipping the housing to a garment of a user of the microphone assembly.

In yet another aspect, the present invention is directed to a method of wirelessly transmitting a voice recording. method may comprise the step of detecting, by a non-graphical-display user interface tap detection circuit of a microphone assembly, a first commence-recording tap sequence by a user of the microphone assembly. The first commence-recording tap sequence corresponds to one of a plurality of operating modes of the microphone assembly. After detecting the first commence-recording tap sequence, the method comprises capturing, by a microphone of the microphone assembly, the voice recording until an end-recording tap sequence corresponding to a command to end the recording is detected. After detecting the end-recording tap sequence corresponding to the command to end the recording, the method comprises wirelessly transmitting, by a wireless communication circuit of the microphone assembly, the captured voice recording to a first network destination that is determined based on the detected first commence-recording tap sequence.

In various implementations, the method may further comprise detecting, by the non-graphical-display user interface tap detection circuit of the microphone assembly, a second commence-recording tap sequence by the user of the microphone assembly. The second commence-recording tap sequence is different from the first commence-recording tap sequence, and corresponds to a second one of a plurality of operating modes of the microphone assembly. After detecting the second commence-recording tap sequence, the method comprise capturing, by the microphone of the microphone assembly, the voice recording until the end-recording tap sequence corresponding to the command to end the recording is detected. After detecting the end-recording tap sequence corresponding to the command to end the recording, the method comprises wirelessly transmitting, by a wireless communication circuit of the microphone assembly, the captured voice recording to a second network destination that is determined based on the detected second commence-recording tap sequence.

It will be apparent to one of ordinary skill in the art that at least some of the embodiments described herein may be implemented in many different embodiments of software, firmware, and/or hardware. The software and firmware code may be executed by a processor circuit or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems, mobile devices, smartphones and/or processors. Software that may cause programmable equipment to execute processes may be stored in any storage device, such as, for example, a computer system (nonvolatile) memory, RAM, ROM, Flash Memory, etc. Furthermore, at least some of the processes may be programmed when the computer system is manufactured or stored on various types of computer-readable media.

A "computer," "computer system," "host," "server," or "processor" may be, for example and without limitation, a processor, microcomputer, minicomputer, server, mainframe, laptop, personal data assistant (PDA), wireless e-mail device, cellular phone, smartphone, tablet, mobile device, pager, processor, fax machine, scanner, or any other programmable device configured to transmit and/or receive data over a network. Computer systems and computer-based devices disclosed herein may include memory for storing certain software modules or engines used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media. The software modules and engines described herein can be executed by the processor (or processors as the case may be) of the computer devices that access the memory storing the modules.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A microphone assembly comprising:
a processor;
a microphone in communication with the processor;
a wireless communication circuit in communication with the processor for transmitting wirelessly from the microphone assembly a voice recording captured by the microphone;
a non-graphical-display user interface tap detection circuit in communication with the processor, whereby the user controls operation of microphone assembly through one or more taps of the user interface tap detection circuit, wherein different tap sequences correspond to different operating modes for the microphone assembly; and
a memory unit in communication with the processor, wherein the memory unit stores instructions that programs the processor to determine a network destination to which to wirelessly transmit, via the wireless communication circuit, the voice recording captured by the microphone based on the operating mode for the microphone assembly that is determined based on the tap sequence detected through the user interface tap detection circuit, such that:
the captured voice recording is wirelessly transmitted, via the wireless communication circuit, to a first network destination when a first tap sequence, corresponding to a first operating mode, is detected through the user interface tap detection circuit; and
the captured voice recording is wirelessly transmitted, via the wireless communication circuit, to a second network destination, different from the first network destination, when a second tap sequence, corresponding to a second operating mode, is detected through the user interface tap detection circuit.

2. The microphone assembly of claim 1, wherein the wireless communication circuit is for wirelessly transmitting the voice recording to the network destination through a wireless access point that is in communication with the wireless communication circuit.

3. The microphone assembly of claim 1, wherein: the memory unit stores addresses for the first and second network destinations; and
the wireless communication circuit is for wirelessly transmitting the captured voice recording to either the first or second network destinations, depending on the operating mode, using the stored addresses for the first and second network addresses.

4. The microphone assembly of claim 1, wherein:
the wireless communication circuit is for wirelessly transmitting the captured voice recording to a remote server, along with data indicative of the operating mode of the microphone assembly as determined by the tap sequence circuit; and
the remote server is for transmitting the captured voice recording to either the first or second network destinations, depending on the operating mode data received from the microphone assembly.

5. The microphone assembly of claim 1, further comprising:
a housing that houses the processor, the microphone, the wireless communication circuit, the non-graphical-display user interface, and the memory unit; and
a clip connected to the housing for clipping the housing to a garment of a user of the microphone assembly.

6. The microphone assembly of claim 1, wherein:
the first network destination comprises a remote intercom system; and
the second network destination comprises a remote notes database server system.

7. The microphone assembly of claim 1, wherein the memory unit stores instructions that programs to the processor to:
wirelessly transmit, via the wireless communication circuit, the captured voice recording to a third network destination when a third tap sequence, corresponding to a third operating mode, is detected through the user interface tap detection circuit.

8. The microphone assembly of claim 7, wherein:
the first network destination comprises a remote intercom system;
the second network destination comprises a remote notes database server system; and
the third network destination comprises a wireless-network-enabled speaker system.

9. The microphone assembly of claim 7, wherein the memory unit stores instructions that programs to the processor:
wirelessly transmit, via the wireless communication circuit, the captured voice recording to a fourth network destination when a fourth tap sequence, corresponding to a fourth operating mode, is detected through the user interface tap detection circuit.

10. The microphone assembly of claim 9, wherein:
the first network destination comprises a remote intercom system;
the second network destination comprises a remote notes database server system;
the third network destination comprises a wireless-network-enabled speaker system; and the fourth network destination comprises a wireless-network-enabled controller for electronic equipment.

11. The microphone assembly of claim 10, wherein the wireless-network-enabled controller comprises a controller for a building automation system.

12. A method of wirelessly transmitting a voice recording, the method comprising:
- detecting, by a non-graphical-display user interface tap detection circuit of a microphone assembly, a first commence-recording tap sequence by a user of the microphone assembly, wherein the first commence-recording tap sequence corresponds to one of a plurality of operating modes of the microphone assembly;
- after detecting the first commence-recording tap sequence, capturing, by a microphone of the microphone assembly, a first voice recording until an end-recording tap sequence corresponding to a command to end the recording is detected;
- after detecting the end-recording tap sequence corresponding to the command to end the recording, wirelessly transmitting, by a wireless communication circuit of the microphone assembly, the first captured voice recording to a first network destination that is determined based on the detected first commence-recording tap sequence;
- detecting, by the non-graphical-display user interface tap detection circuit of the microphone assembly, a second commence-recording tap sequence by the user of the microphone assembly, wherein:
  - the second commence-recording tap sequence is different from the first commence-recording tap sequence; and
  - the second commence-recording tap sequence corresponds to a second one of a plurality of operating modes of the microphone assembly;
- after detecting the second commence-recording tap sequence, capturing, by the microphone of the microphone assembly, a second voice recording until the end-recording tap sequence corresponding to the command to end the recording is detected; and
- after detecting the end-recording tap sequence corresponding to the command to end the recording, wirelessly transmitting, by the wireless communication circuit of the microphone assembly, the second captured voice recording to a second network destination that is determined based on the detected second commence-recording tap sequence.

13. The method of claim 12, further comprising:
- storing, by the microphone assembly, network addresses for the first and second network addresses; and
- using, by the wireless communication circuit, either the stored first or second network addresses to wirelessly transmit the voice recording to the first or second network destinations based on the detected operating mode.

14. The method of claim 12, further comprising storing, by the microphone assembly, a network address for a remote server, and
wherein wirelessly transmitting, by the wireless communication circuit, the voice recording to either the first or second network destinations depending on the detected operating mode comprises:
- wirelessly transmitting, by the wireless communication circuit, to the remote server, the voice recording and an indication of the detected operating mode of the microphone assembly; and
- the remote server transmitting the voice recording to either the first or second network destinations depending on the operating mode of the microphone assembly.

15. The method of claim 12, further comprising, prior to detecting the first commence-recording tap sequence, clipping, by a user of the microphone assembly, the microphone assembly to a garment of the user with a clip of the microphone assembly.

* * * * *